No. 736,349. PATENTED AUG. 18, 1903.
W. G. BELL.
RECEPTACLE FOR CORNED BEEF, &c.
APPLICATION FILED APR. 1, 1903.
NO MODEL.

Witnesses:
P. W. Pezzetti
E. Batchelder

Inventor:
W. G. Bell
by Wright, Brown & Quinby
attys.

No. 736,349.

Patented August 18, 1903.

UNITED STATES PATENT OFFICE.

WILLIAM G. BELL, OF NEWTON, MASSACHUSETTS.

RECEPTACLE FOR CORNED BEEF, &c.

SPECIFICATION forming part of Letters Patent No. 736,349, dated August 18, 1903.

Application filed April 1, 1903. Serial No. 150,514. (No model.)

*To all whom it may concern:*

Be it known that I, WILLIAM G. BELL, of Newton, in the county of Middlesex and State of Massachusetts, have invented certain new and useful Improvements in Receptacles for Corned Beef, &c., of which the following is a specification.

This invention has for its object to provide a durable, convenient, and liquid-tight receptacle for corned beef and other articles of food which are immersed in a preserving liquid.

The invention consists in the improvements which I will now proceed to describe and claim.

Figure 1:
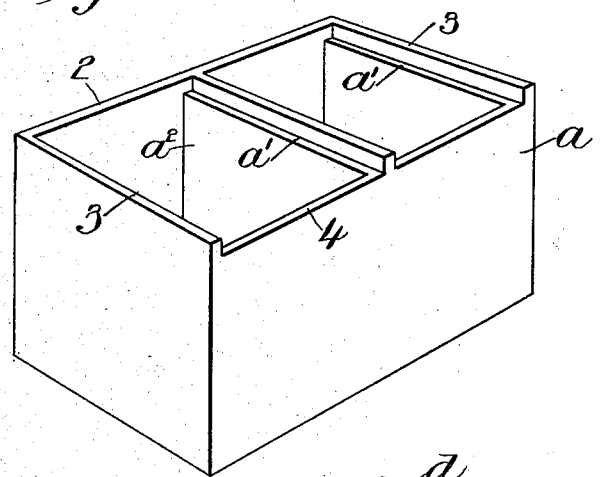
Figure 2:
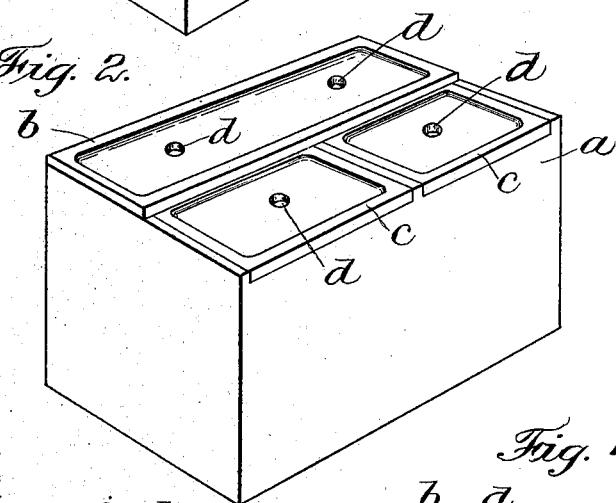
Figure 3:
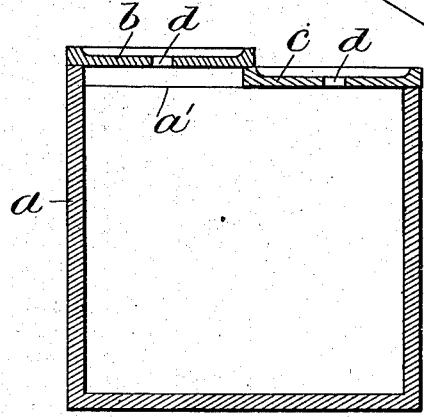
Figure 4:
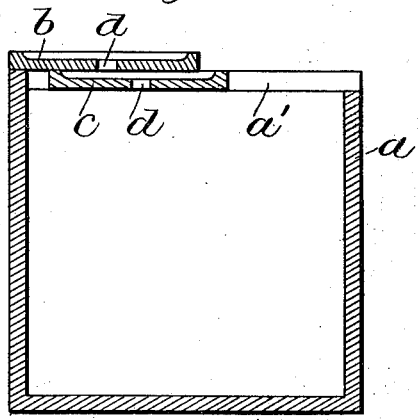

Of the accompanying drawings, forming a part of this specification, Figure 1 represents a perspective view of the body portion of my improved tank, the covers being removed. Fig. 2 represents a perspective view showing the covers in place and the tank closed. Fig. 3 represents a vertical section showing the tank as represented in Fig. 2. Fig. 4 represents a view similar to Fig. 3, showing the sliding cover moved backwardly to permit access to the interior of the tank.

The same reference characters indicate the same parts in all the figures.

In the drawings, $a$ represents a tank of rectangular form which is preferably molded without seams or joints from suitable cement or artificial stone, any suitable composition being employed. In Fig. 1 I have shown the tank provided with a central partition $a^2$, dividing its interior into two compartments, each constituting practically an independent tank; but it will be obvious that my invention, as hereinafter described, may include a tank without the said central partition. The rear wall 2 and the end walls 3 3 are raised at their upper edges somewhat higher than the front wall 4, as clearly shown in Fig. 1.

$b$ represents a fixed cover which is located over the rear portion of the top of the tank and is supported by the raised upper ends of the back and end walls, said cover $b$ extending about half-way from the back to the front of the tank.

$a'$ $a'$ represent horizontal shoulders or guides formed on the inner sides of the end walls, said guides being flush with the upper edge of the front wall and separated from the underside of the fixed cover $b$ by a space sufficient to permit the sliding cover $c$ to be moved backwardly under the fixed cover $b$, as shown in Fig. 4. The sliding cover $c$ is formed to supplement the fixed cover $b$ in covering the top of the tank, as shown in Figs. 2 and 4. When the sliding cover is moved backwardly, as shown in Fig. 4, it permits access to the interior of the tank. The covers $b$ and $c$ are preferably made from the same material as the body of the tank. Each cover is hollowed out or dished on its upper surface, the entire marginal portion of said surface being raised above the central portion, so that all the drainage from a piece of corned beef laid upon either cover will be prevented from flowing outwardly over the edge or edges of the cover by the raised margin thereof. Each cover is provided with one or more drainage-orifices $d$, which permit the liquid to pass from the top of the cover into the interior of the tank.

When it is desired to remove a piece of beef from the tank, the sliding cover $c$ is moved backwardly under the fixed cover $b$ and the piece is removed and laid upon the fixed cover to drain. The sliding cover is then moved forward, as shown in Fig. 3, and the piece of beef may then be transferred to the sliding cover for inspection by the customer, and after being further drained on the sliding cover it may be removed for delivery. It will be seen, therefore, that provision is made for conveniently draining and displaying the pieces of beef, the tank being left in a closed condition after the sale and delivery of the piece. By thus draining directly into the tank I avoid all liability of spilling or scattering the brine or pickle outside the tank. When a piece of beef is placed upon the fixed cover $b$ and a sliding cover $c$ is in such position as represented in Fig. 4, liquid draining from the beef through an orifice $d$ of the fixed cover will not remain upon the sliding cover, but will escape through the orifice $d$ of the latter into the tank. Therefore practically no liquid will remain upon either of the covers.

If desired, a receptacle containing ice may be introduced into the interior of the tank.

When the tank is made double, as shown in Figs. 1 and 2, a piece of beef removed from one compartment may be laid upon the sliding cover of the other compartment to be drained and displayed.

I claim—

1. A receptacle of the character stated comprising a tank having a fixed half-cover located over the rear portion of the tank, a sliding front cover formed to cover the front portion of the tank and movable into and out of the space covered by the fixed cover, said sliding cover and the fixed half-cover each having a dished top and one or more drainage-apertures adapted to conduct liquid into the interior of the tank.

2. A receptacle of the character stated comprising a tank having its back and end walls elevated above its front wall, said end walls being provided with shoulders or guides, a fixed cover located over the rear portion of the tank and supported by the said back and end walls above said guides, and a sliding cover formed to fill the space between the fixed cover and the front of the tank, and movable on said guides into and out of the space between the guides and the fixed cover, each cover having a dished top and one or more drainage-apertures.

In testimony whereof I have affixed my signature in presence of two witnesses.

WILLIAM G. BELL.

Witnesses:
C. F. BROWN,
E. BATCHELDER.